United States Patent [19]
Courvoisier

[11] Patent Number: 5,943,412
[45] Date of Patent: Aug. 24, 1999

[54] METHOD AND APPARATUS FOR ESTABLISHING AN ISDN CALL BETWEEN PARTIES

[75] Inventor: Denis Courvoisier, Marseilles, France

[73] Assignee: France Telecom, Paris, France

[21] Appl. No.: 08/790,602

[22] Filed: Jan. 29, 1997

[30] Foreign Application Priority Data

Jan. 31, 1996 [FR] France .................................. 96/01432
Jul. 22, 1996 [FR] France .................................. 96/09408

[51] Int. Cl.[6] ...................................... H04M 3/42
[52] U.S. Cl. ............................ 379/220; 379/201; 379/230
[58] Field of Search ..................................... 379/201, 207, 379/210, 211, 212, 219, 220, 221, 229, 230

[56] References Cited

U.S. PATENT DOCUMENTS

| | | | |
|---|---|---|---|
| 5,008,930 | 4/1991 | Gawrys et al. | 379/211 |
| 5,018,191 | 5/1991 | Catron et al. | 379/211 |
| 5,197,096 | 3/1993 | Sakuma et al. | 379/211 |
| 5,233,648 | 8/1993 | Nakamura | 379/211 |
| 5,272,748 | 12/1993 | Davis . | |
| 5,416,834 | 5/1995 | Bales et al. | 379/211 |
| 5,425,085 | 6/1995 | Weinberger et al. . | |
| 5,452,349 | 9/1995 | Uehara et al. | 379/211 |
| 5,479,496 | 12/1995 | Endo et al. | 379/211 |
| 5,509,062 | 4/1996 | Carlsen | 379/211 |
| 5,550,907 | 8/1996 | Carlsen | 379/211 |
| 5,553,128 | 9/1996 | Grimes | 379/211 |
| 5,646,945 | 7/1997 | Bergler | 379/211 |
| 5,684,870 | 11/1997 | Maloney et al. | 379/211 |
| 5,787,257 | 7/1998 | Kusunoki | 379/211 |

FOREIGN PATENT DOCUMENTS

| | | |
|---|---|---|
| 0493896 | 8/1992 | European Pat. Off. . |
| 8807797 | 6/1988 | WIPO . |
| 9428683 | 8/1994 | WIPO . |

OTHER PUBLICATIONS

IEEE Communications Magazine, vol. 27, No. 7, Jul. 1989, pp. 41–48, Matsuo et al., "Personal Telephone Services Using IC–Cards".

*Primary Examiner*—Scott Wolinsky
*Attorney, Agent, or Firm*—Dvorak & Orum

[57] ABSTRACT

In a switched telecommunication network (PSTN or ISDN) between a calling party connected to an ISDN switched digital network and a destination called party whose call number is written "Z", the number "Z" of the destination called party is automatically replaced by a number "Y" for an intermediate site which is connected to the ISDN, and the number "Z" of the destination called party is conveyed to the intermediate site, via the ISDN D channel. This substitution process is extended to interconnections between competing ISDN networks and creates a new kind of signaling for use between public exchanges, intermediate between protocol D and ITU-T semaphore channel number 7.

6 Claims, 5 Drawing Sheets

METHOD AND APPARATUS FOR ESTABLISHING AN ISDN CALL BETWEEN PARTIES

FIELD OF THE INVENTION

The present invention relates to a method protocol, and apparatus for telecommunication between parties of a telecommunications network, in particular by voice. The network may be the integrated services digital network (ISDN) or the public switched telephone network (PSTN).

The technical field of the invention is that of telecommunications.

The invention applies to telecommunication of data, or digital messages, or graphics, e.g. to transferring files at a rate of 64 kilobits/second, or to fax transmissions at a rate of 9600 bits/second, and also to transmitting voice messages, i.e. to telephony.

A telephone call is established between a calling party and a called party via one or more service providers, i.e. owners or "operators" of voice telecommunications networks, and possibly via an intermediate site, sometimes referred to as a communications retailer.

This term is generally used to designate a private organization which purchases telephone calls "in bulk" at favorable rates from a service provider owning a public network, and resells calls "retail" to individual clients or parties.

BACKGROUND OF THE INVENTION

Telecommunications retailers (in particular for voice) offer their individual clients or parties various call access modes (in particular for telephone calls) that are generally of the following three types:

- a first access mode consists, for the individual client or party, in leasing a direct and permanent link to the communications retailer who bills the client (individual party) in particular by monitoring the (quantity of) information traffic passing over the leased link; this mode of access gives a high level of security in identifying the calling party;
- another access mode consists in making a voice server connected to a conventional switched telephone network available to parties; the voice server enables a party calling the communications retailer to identify his or herself by means of a client or billing account number, possibly authenticated by a code number, and to dial the number of the final destination by using the (voice frequency) keys on the telephone set, some equipment enables these operations to be automated and enables the caller to dial the desired destination directly, thereby preserving calling habits; and
- a third access mode is by automatic callback and requires the client (or calling party) to call the automatic callback company connected to a switched telephone network (PSTN or ISDN); with this access mode, the calling party hangs up after calling the retailer and waits for the retailer (i.e. the automatic callback company) to call back.

These various access modes have drawbacks. To be economic, the cost of a direct leased line requires a large quantity of telecommunications and thus a sufficiently large amount of traffic to enable individual clients to benefit from prices that are lower than those offered by locally-available service providers. Access to a retailer fitted with a voice server requires telephone users to change their habits since the dialing that must be performed by the calling party is different from direct dialing using the public numbering plan that is normally used when passing via the network service provider. In addition, this mode of access does not provide sufficient security for the call retailer concerning identification of the calling party, given that the account number and/or the code number of the calling client can be stolen and used by an unauthorized third party. In its automatic version, the voice server is handicapped to the detriment of the calling party, or of the intermediate site if access is via a free number (0 800<<N° Vert>> in France) or of both of them if access is via a shared charging number (0 801<<N° Azur>> or 0 802<<N° Indigo>> in France), by a charge being made for calls that are ineffective or that do not terminate (busy, no answer, saturation, etc. . . . ), since an ordinary call is indeed set up prior to the desired call for the purpose of passing on call parameters concerning the desired destination party (signalling in the audio band). In certain cases that have recently been analyzed, ineffective calls can represent 10% to 15% of the telecommunications budget of the calling party using the communications retailer at the intermediate site. In the access mode that makes use of automatic callback by a retailer connected to a switched telephone network or to an integrated services digital network, the callback procedure suffers from the major drawback associated with the fact that the caller must wait for the return call made by the intermediary or by the retailer (meanwhile the caller may be called by a third party, or all accesses to a PABX may become busy).

Integrated service digital networks (ISDNs) have characteristics specified by numerous ISO, CCITT/ITU-T standards; such networks are organized as a plurality of B and D type transmission channels together with corresponding protocols; B channels (circuit mode) are dedicated mainly to carrying messages or data to be communicated; D channels (packet mode) are dedicated mainly to carrying signalling information required for controlling the B channels and for the provision of supplementary services; standards also define various types of interface, including so-called "T" and "E" interfaces, defining reference points for network architecture purposes and enabling the various items of equipment that make up the network to be interconnected.

Automatic devices are also known for selecting a telecommunications service provider for the purpose of minimizing cost and/or optimizing telecommunications quality:

- U.S. Pat. No. 5,425,085 describes a telecommunications rerouting (diversion) device; the device described is specifically designed to be interposed between an analog telephone terminal and an STN (switched telephone network) type analog network;
- international application WO 88/07797 describes a unit interposed between a telephone terminal and the network; the unit is connected to a computer; and
- international application WO 94/28683 describes circuits for generating price signals and circuits for selecting a telecommunications service provider, as a function of the price signal.

Telecommunications systems are also known whereby an abridged or generic number for a service (private numbering plan) is replaced by a public number plan number taken from a memory or database:

- U.S. Pat. No. 5,272,748 describes a system for putting a payphone into communication with a voice information server, or with the switchboard of a taxi firm (private numbering plan); and
- European patent application EP 493 896 describes a system for selecting the call number of a store close to the home of the calling party in order to set up a call on the basis of a short number common a plurality of stores (single number services, such as 0 800<<N° Vert>> in France).

None of those documents describes or suggests making use of ISDN functions for rerouting a call and for setting up a call very quickly, cheaply, and reliably.

OBJECTS AND SUMMARY OF THE INVENTION

An object of the present invention is to provide an improved access mode to a communications retailer (or service provider).

More particularly, an object of the invention consists in proposing an access mode for a calling party seeking to enter into telecommunication (in particular by voice) with a called party via a retailer or an intermediate site, in a manner that is automatic and transparent to the calling party, i.e. without requiring the calling party to change habits concerning the use of switched telephone networks.

Another object of the invention consists in enabling a telecommunications retailer to be sure of obtaining a high level of seucrity concerning the identification of calling parties.

The invention thus applies to a method of telecommunication between an arbitrary first party, referred to as the "calling" party, and an arbitrary third party, referred to as the "called" party, with the first and third parties both being connected to an (automatic) switched telecommunications network via a terminal link of analog type (STN) or of digital type (ISDN), which network includes a switching site, referred to as an "intermediate" site; in accordance with the invention, the call number, written "Z", of said third party is transmitted to said intermediate site via the ISDN signalling D channel.

To this end, the intermediate site is provided with an ISDN interface whereby it receives said call number "Z".

In a first aspect of the invention, it thus suffices to fit the intermediate site with one or more ISDN-PABXes used in this case as transit nodes instead of the normal use of serving a plurality of terminals situated on a common private site; naturally the capacity of a PABX is small compared with the large telephone exchanges of the public network, but it has the advantage of being much cheaper, in particular because an exchange of this type is not provided with enriched signalling channels such as the SS7 channel or according to ITU-T (that to be found in public networks).

The invention makes it possible in particular for companies that already have transmission means such as (regional, national, or international) links via optical fibers or microwave beams, in particular, e.g. railway companies, to set themselves up as communications retailers or service providers, while requiring limited investment for the purposes of acquiring, connecting, and commissioning an ISDN PABX.

For this purpose, the retailer's intermediate site must be connected to a telecommunications exchange of a public switched telephone network via an ISDN link: said public telephone network being characterized by its ability to serve the caller having the number "X" in a terminal portion thereof (a local loop); and the intermediate site corresponding to a national or regional network party, with a call number written "Y" naturally being allocated thereto.

When any calling party connected to the automatic telecommunications network seeks to establish a call with any called party also connected to the automatic telecommunications network, the calling party dials the usual number "Z" in full, i.e. the number which is allocated to the called party in the numbering plan of the public network under consideration. The calling party preferably dials a code (such as one or more digits) immediately followed by or following the number "Z", said code constituting a selection code specifying that the call is to transit via a determined intermediate site, thus, in France, the digit or prefix "0" is reserved for the service provider FRANCE TELECOM in charge of the national network, while the digits 1, 2, 4, 6, 8, and 9 are available for being allocated to competing long distance service providers. The called number "Z", together with the possible code is addressed by the terminal to the telecommunications exchange to which the terminal is connected; the telecommunications exchange looks to see whether a rerouting (or diversion) condition is satisfied; this will be the case if the exchange detects the presence of said selection code; in the absence of said code, this could still apply if the telecommunications exchange, after consulting a database, observes that the number of the calling party is to be found in its database as corresponding to a party for which all calls should be diverted via a specified intermediate site.

If the rerouting condition is satisfied, a call request is made to number "Y" (for the intermediate site) instead of the called number "Z". The number "Z", possibly after transcoding, is sent from the exchange to the intermediate site using a parameterizable service of the D channel of an ISDN link connecting the exchange to the intermediate site. The intermediate site detects the called number "Z" transmitted in this way (possibly after decoding it), and itself proceeds to make an outgoing call to the called party "Z". Providing the called party is available, the two calls are interconnected via the various nodes of the network, including the node constituted by the intermediate site.

Thus, in this first aspect (or application), the invention consists in a method of setting up a call between an arbitrary calling party of call number "X", and an arbitrary destination called party of call number "Z", which calling and called parties are both connected to an automatic telecommunications network that includes first and second transit nodes (which first and second transit nodes are controlled by and/or belong to two different entities or "operators"), wherein, in order to divert (or reroute) said call from said first node to said second node which constitutes an intermediate site (given call number "Y"), which first and second nodes are interconnected via an ISDN link, said number "Z" of the destination called party is transmitted from said first node to said second node via the signalling D channel of the ISDN link; preferably, in said first transit node, the number "Z" of the destination called party is replaced by the call number "Y" of said second node or intermediate site, which node is itself selected as a function of a code "A" selected and issued by the calling party.

In this first application of the invention, the calling party can be connected to the network via an analog terminal link or via a digital terminal link.

In a second application and in a second aspect of the invention, the invention proposes using and implementing a telecommunications method between a first party having call number "X" and connected to an ISDN network, and a third party (or called party or destination party) whose telephone call number is written "Z" (with the third party optionally being connected to said ISDN network), in which a number "Y" of an intermediate, second party (or site) connected to said ISDN network is automatically substituted for said number "Z" of the destination called party, and said number "Z" of the destination called party is transmitted to said second party (or called intermediate site) via the D channel of the ISDN network via one of the optional remote services for call setup (e.g. sub-addressing or user-to-user signalling).

In this second application:

a) a calling party uses a terminal keypad to dial the number "Z" of a called party to whom a message (M) is addressed, the calling terminal being connected to an ISDN telecommunications network via an S type interface;

b) the called number "Z" is preferably encoded by coding means and is transmitted together with the message (M) to a first intermediate switching site or retailer;

c) the first intermediate site decodes (or detects) the called number "Z" using decoding means and it transmits the message M to the called party, generally via a second intermediate site or service provider; and the number "X" of the caller is transmitted directly to the first intermediate site via the signalling D channel of the ISDN network, by the standard service for identifying an ISDN caller.

In preferred embodiments of the invention:

the means for encoding the number "Z" of the called party are all-digital, and in the second embodiment they can be integrated (preferably in the form of software) in the interface of the calling party terminal, while in the first application the means for encoding the number "Z" are integrated in the network exchange which is connected to the intermediate site by the ISDN link; and an alpha identification code "A" for selecting a first and/or a second intermediary is selected from a predetermined list of selection codes (for first and/or second) intermediaries (with the selection being made by the calling user dialing the code on the keypad, or being automatically made by the interface of the terminal).

For a telephone message, the message M is a voice message.

In accordance with the invention, use is made of one or other of two supplementary services (or fields) in the ISDN D channel, which services can be parameterized from any appropriate subscriber terminal (interface S), and also, naturally, by the network exchange which is connected by ISDN to the intermediate site: these two services are the sub-addressing service and the user-to-user signalling service.

In preferred implementations of methods of the invention:

prior to transmitting the number "Z" of the destination called party, the length L of the number "Z" is calculated and information representing said length L is transmitted prior to transmitting said number "Z"; and the call is established between the calling first party and the destination third party via the intermediate party only after it has been checked that the number of the destination called party is available.

The invention also consists in providing a digital telecommunications terminal (and/or party installation comprising a plurality of terminals together with at least one private exchange), and in particular a telephone terminal, comprising:

for a telephone terminal: an interface module with a telephone handset and, for example, a loudspeaker;

an interface module with an ISDN;

a keypad or input unit, preferably together with a display or display unit;

a user interface module which is connected to said input and display units; and a main terminal processing or control module which is connected to said user interface module, to said ISDN interface module, and to said handset interface module via links and controlling the operation of the terminal;

which terminal includes processing means and a memory unit containing a call number "Y" for an intermediate site or second party, which processing means includes substitution means for replacing a number "Z" requested by the user with said number "Y" recorded in said memory unit; said processor means preferably including means for encoding or transforming said requested destination called number "Z" (in particular by subdivision or cutting up) into one or more messages, which terminal preferably includes means for calculating the length of the destination called number requested by the user.

The invention thus provides a telecommunications system, in particular between a calling party of number "X" and a destination called party of number "Z" in which the calling party uses a terminal of the invention which is connected to an ISDN, as is an intermediate site, and in which the intermediate site includes means for detecting (and/or decoding) the destination called number as transmitted by a messagetransmission service (e.g: sub-addressing or user-to-user signalling) of the signalling D channel of the ISDN to which it is connected.

In a telecommunications system according to said second application of the invention, each of the calling terminals or sites is fitted with a device for substituting and/or encoding the called number, which device is also referred to below as a "dialing translator" (referred to herein as TDN). This device takes charge of the calling client's request for voice communication and automatically transmits it to the intermediate site or communications retailer. The server or communications device fitted at said intermediate site includes a device for decoding and/or recognizing the destination called number as encoded by the terminal of the calling party, which decoding and/or detection device is referred to below as an "indirect call handler" preferred to herein as GAI). The device retrieves the calling party's call request and repeats it to the control members or output access members of the intermediate site (communications retailer) and interconnects the two calls, i.e. client-to-retailer and retailer-to-destination (service provider or destination-called party).

The second application of the invention also enables a service provider that owns or operates a first network (e.g. on a first national territory) to install and connect to a second network (e.g. on a second national territory) an intermediate site fitted with the above-specified decoding means, so as to set up on the second territory as a telecommunications retailer.

BRIEF DESCRIPTION OF THE DRAWINGS

The numerous advantages provided by the invention will be better understood from the following description given with reference to the accompanying drawings which show preferred embodiments of the method of the invention, but without the invention being limited thereto in any way.

Unless stated to the contrary, elements which are functionally and/or structurally identical or similar are identified by identical numbers or letters in the various figures.

DETAILED DESCRIPTION OF THE PREFERRED EMBODIMENT

Three variant embodiments of the invention are described in greater detail below; a first variant consists in rerouting a call from a first transit node (of a first service provider) such as a telephone exchange to a second transit node (belonging to a second service provider) constituting an intermediate site, with the first and second transit nodes being interconnected by an ISDN link whose D channel is used for transmitting the number "Z" of the destination called party from the first node to the second node; two variants of the second application of the invention use transmission of the number "Z" of the destination called party (referenced 8, FIG. 1) over the signalling D channel of the ISDN network (referenced 2) to which both the calling party and the intermediate site 4 are connected.

Use of the invention then becomes entirely "transparent" for the user, i.e. there is no need for the user to change dialing habits providing only one intermediate site is used and that site is used on all occasions, with all calls being rerouted thereby, in which case the user can only activate or inhibit use of the rerouting or call substitution function, e.g. by using a terminal function key dedicated to performing such (binary) selection. In other embodiments of the invention, the user can select rerouting via a particular intermediary selected from a list of predetermined intermediaries whose call numbers and corresponding data can be recorded in a memory zone (reference 14, FIG. 2) or a file of the terminal or interface of the device fitted at the calling site. In which case the user can, for example, select which intermediary is desired for rerouting a given call by dialing or keying-in a code representing the selected intermediary taken from said predetermined list of intermediaries.

Figure 3:
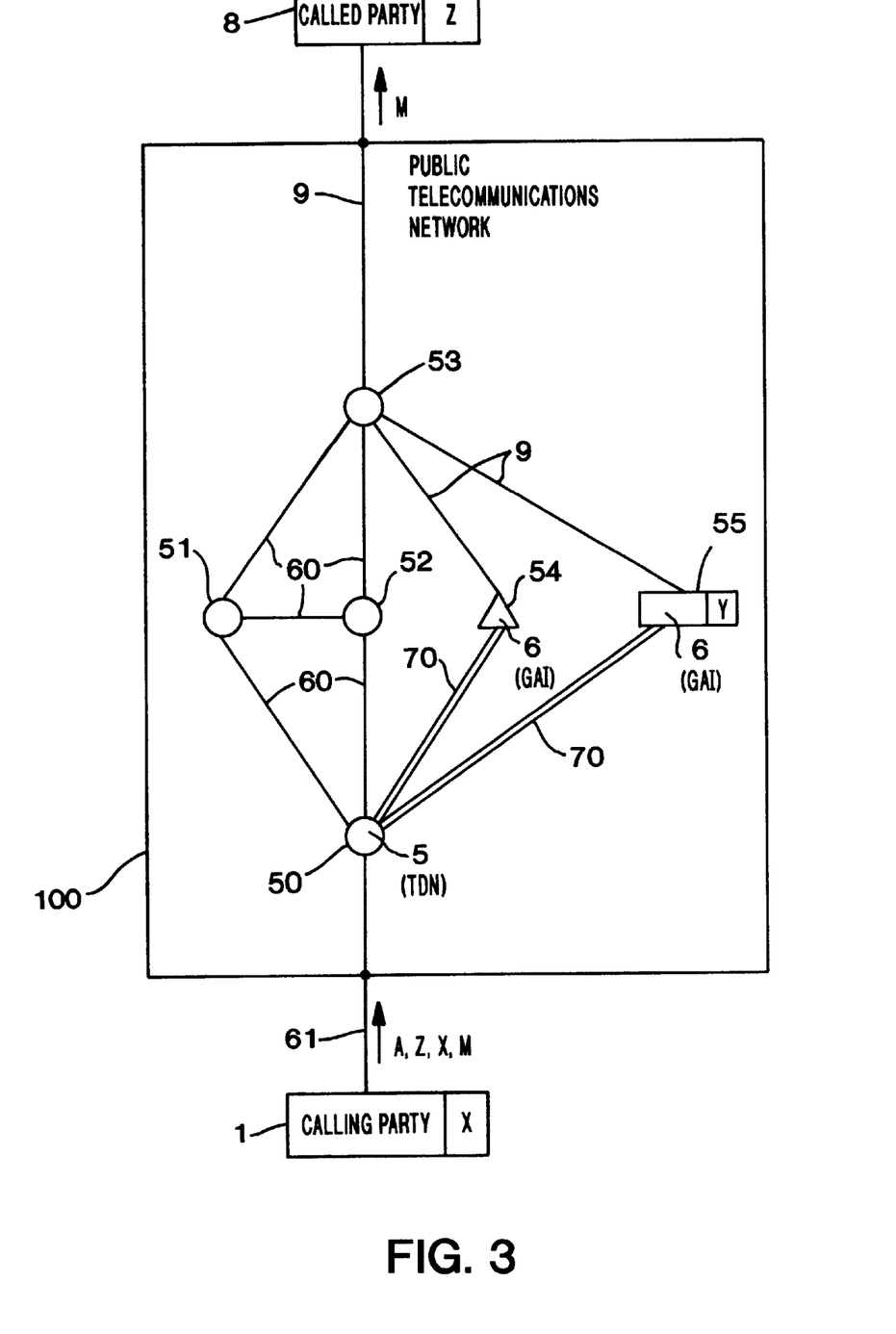
FIG. 3 shows a communications system in the first application of the invention.

With reference to FIG. 3, the public telecommunications network 100 to which the calling party 1 and the called party 8 are connected includes a plurality of interconnected transit nodes:

four nodes 50, 51, 52, 53 interconnected by links 60 and belonging to a first service provider;

a node 54 connected to nodes 50 and 53 respectively via an ISDN link 70 and a link 9, and belonging to a second service provider; and a node 55 also connected to node 50 via an ISDN link 70, and to node 53 via a link 9, and belonging to a third service provider.

Depending on which one of the nodes 54 and 55 the calling party wants to carry the call, a corresponding selection code "A" is dialed (e.g. "1" to select node 54 belonging to the second service provider and "2" to select node 55 belonging to the third service provider).

To this end, the code "A" is transmitted by the calling terminal 1 (together with the called number "Z") via the terminal link 61 to the telephone exchange 50. After the TDN module 5 of the exchange 50 has identified the selection code "A", which in this example is equal to "2", the exchange 50 sets up a call request with the node 55 constituting the site 4 whose call number is "Y", and transmits the destination called number "Z" to the intermediate site 4 (or node 55) via the D channel of the ISDN link between the exchange 50 and the node 55 in a manner described in greater detail in the second and third variants below.

After a call has been set up passing via the nodes 50, 55 and 53, the message M is transmitted over the corresponding links between the caller 1 and the called party 8.

In modern public networks, the present apparatus can take full advantage of Intelligent Network type architecture. With this type of architecture, switching nodes and other network resources are controlled by one or more (possibly remote) computers (known as service control points (PCS) in the France Telecom network). A <<network PCS>> PCS-R) is in charge of running of a given type of service in real-time. It is a PCS-R that constitutes the platform for the software corresponding to the logic of the service in question. Signalling is preferably via ITU-T SS7 semaphore channels, assuming that public telephone exchanges and other resources have been modified accordingly. When in Intelligent Network type architecture is applied to the present apparatus, the exchange 50 acts a service access switch (CAS: triggering call processing by the network PCS). The PCS-R then controls the process whereby the number "Z" is replaced by the number "Y", with the number "Z" being encoded in an appropriate supplementary service within the D channel.

SECOND AND THIRD VARIANT EMBODIMENTS

In the second and third embodiments, when an individual caller unhooks the telephone handset (reference 20, FIG. 2) of terminal 1, the TDN of terminal 1 waits (step 100, FIG. 4) for the requested destination number "Z" to be dialed.

Figure 4:
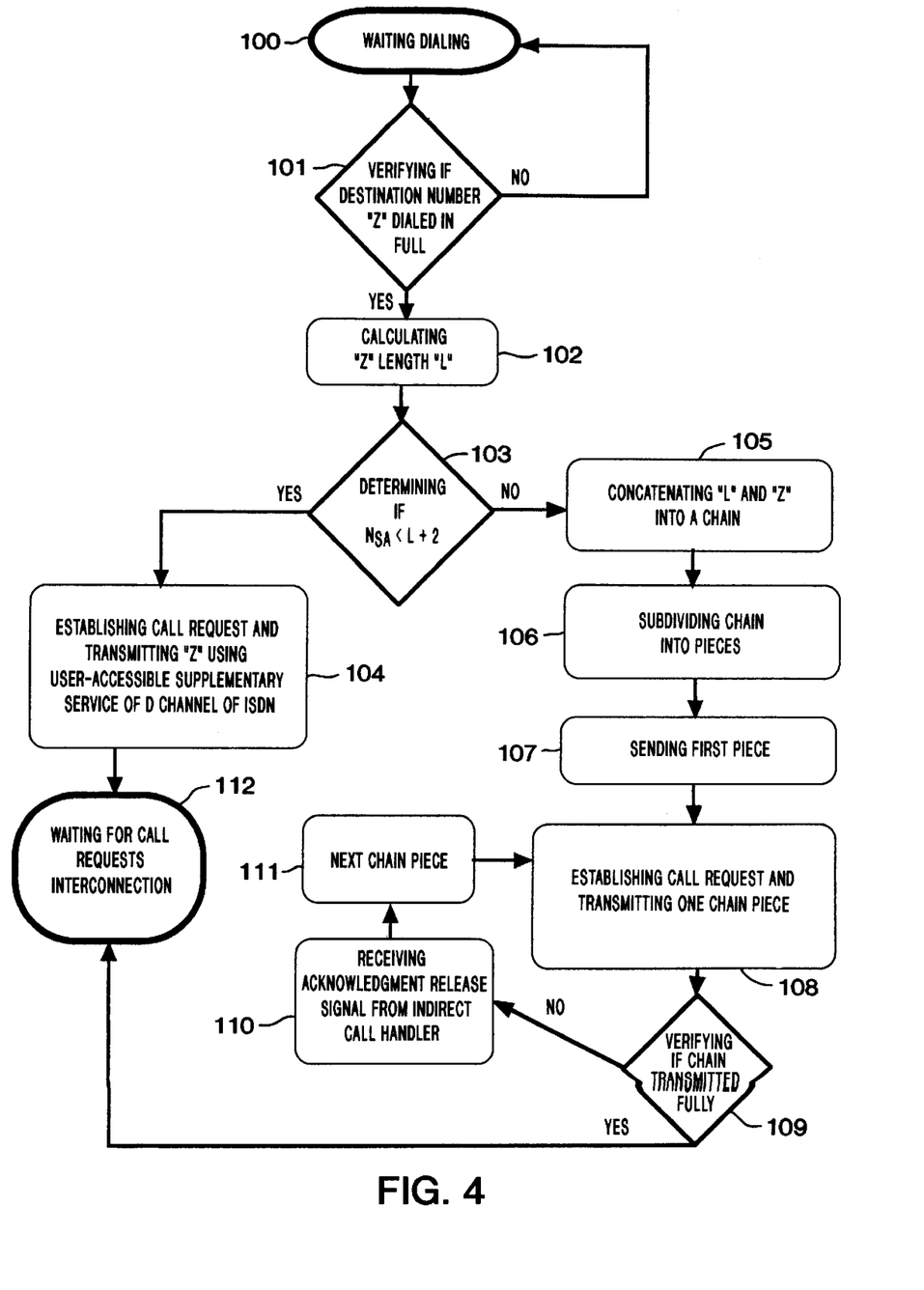
FIG. 4 is a diagram showing operating steps of the TDN.

Once the number has been dialed in full (test 101), the TDN requests (step 104) an ISDN call, identifying the caller to the communications retailer 4, whose call number "Y" is known to the TDN. This call is set up using the standard services of the ISDN signalling D channel.

The TDN injects into the D channel the number "Z" of the destination called party requested by the individual client, said number "Z" then being in the form of a code that is predefined and known to the GAI.

The retailer then has all of the information necessary to make it possible to forward the request of the individual client: i.e. the identity of the client and the number of the destination called party.

When an ISDN call request is received (step 200, FIG. 5) at the retailer, the GAI at the intermediate site 4 verifies (test 201) whether the request has been made in caller identification mode. If not, the retailer 4 does not continue with the request (step 202). If so, the GAI makes a request for the calling number to be compared (test 203) with the list of customers authorized by the retailer.

Figure 5:
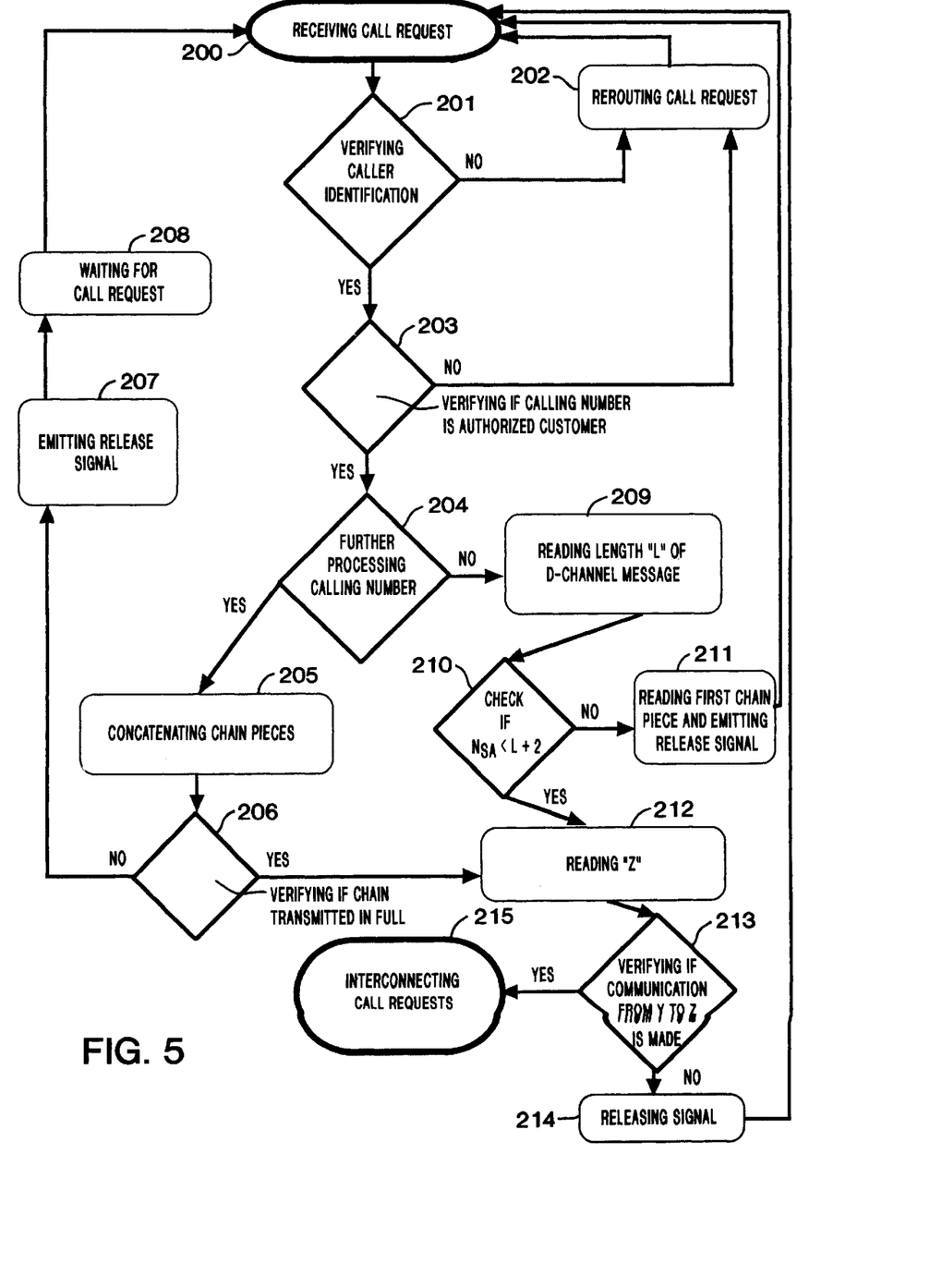
FIG. 5 is a diagram showing operating steps of the GAI.

Providing the caller's number "X" is indeed the number of an authorized client, the GAI decides to continue the process.

Once the number "Z", whether in code form or otherwise, has reached the GAI, it decodes it (steps 209 and 212) and transmits it to members for controlling output access from the retailer; if communication from "Y" to "Z" is established (test 213), the GAI is asking for interconnection (step 215) of a client-to-retailer call and a retailer-to-destination call (i.e. a service provider 7 or indeed a called number 8); otherwise, the GAI releases (step 214).

The use of the second and third variant implementations of the invention in which the ISDN signalling D channel is used for transmitting messages representative of the number "Z" of the destination called party from the caller to the intermediate site, presents the advantage over setting up a call between the caller and the intermediary or the first intermediary via ISDN speech B channel (which starts charging for the caller), whereby charging does not take place unless the destination party can be reached, i.e. after the equipment installed on the intermediate site has verified that a call is possible. That applies to ISDNs which do not charge for parameterizable supplementary services on the D channel (such as sub-addressing or user-to-user signalling).

The second embodiment uses the "sub-addressing" supplementary service of the ISDN to convey the number "Z" of the destination called party from the caller "X" to the first intermediary "Y".

International standards define the "sub-addressing" supplementary service.

It comprises a field of a maximum of 40 decimal digits added to the call number in the public numbering plan. At present, this size makes it possible to convey any number in any public numbering plan of any country.

It therefore suffices for the TDN to use this supplementary service to convey to the communications retailer the number "Z" of the destination called party.

This information required for setting up a call between the caller and the destination called party thus travels over the D channel (in the ISDN call setup message). Using the ISDN B channel would require a voice call to be established between "X" and "Y" to convey the number "Z" without it being possible to know whether the called party "Z" is going to answer. This would result in the caller being charged on each attempt at making a call, even for attempts that are unsuccessful or defective. This drawback does not exist in the second and third variants of the present invention (in France, use of sub-addressing is free). Another important consequence of using the D channel consists in greater reliability with which the number "Z" is transmitted, since the B channel is much more sensitive to all kinds of noise than is the D channel which is dedicated to conveying digital signals by using reliable telecommunications protocols.

In national ISDN implementations, the sub-address field is generally restricted to some number of decimal digits that is smaller than 40. For example, the sub-address may be restricted to four decimal digits only (such as in France). This limit is insufficient for carrying any number in the worldwide public numbering plan. Under such circumstances, the second embodiment adapts to constraints on the size of the sub-address as follows.

Let Nsa (Nsa>0) be the maximum number of decimal digits that a given ISDN sub-address can contain.

The calling terminal device uses a plurality of successive call setup requests to convey the number of the called party in full to the retailer. A complementary (analogous) device at the retailer end does not set up the call until the number has been received in full. As a result, telephone charges are not incurred for a corresponding number of setup calls in ISDNs where use of sub-addressing is free (e.g. in France).

By way of example, the first two digits of the sub-address of the first call setup message give the length of the destination called number (e.g. expressed as a number of decimal digits, e.g. lying in the range 1 to 99). In this way, the analogous device at the retailer end knows how many call attempts it needs to expect before attempting to set up the call. Such coding is similar to the standardized basic encoding rules (BER) using in the upper layers of the OSI model (ITU-T Recommendation X209, where ITU stands for International Telecommunications Union, which used to be known as CCITT for Comité Consultatif International de Téléphone et du Télégraphe) or ISO standard 8825 (where "ISO" stands for International Standards Organization). In the latter case, type, length, and value encoding is used whereas in the present case, since only a single type of value needs to be encoded (a telephone number), length and value encoding suffices.

If Nte is the number of attempts at establishing a call, if L is the number of decimal digits in the number "Z" of the destination called party (i.e. the length of that number), and if E(n) designates the integer portion of the integer n, then Nte E([L+1]/Nsa)+1. The parameter L is passed first to the device at the first intermediary so as to enable it to calculate Nte. For all call requests coming from a given caller "X" (test 204) and with the exception of the last or Nte-th request according to test 206, the GAI returns (step 207 or 211) a negative acknowledgment (release) to the call setup request so as to disconnect the call, thereby enabling (after waiting 208) successive Nte call setup requests to follow on very quickly (by using channel D only).

It is essential to use the ISDN caller identification service in order to convey "Z" to the first intermediary, since otherwise ambiguities could appear. Supposing two different callers are seeking to make contact with "Y" simultaneously, there is no other way for the GAI to distinguish between them. If it does not distinguish between them, then it will concoct a destination called number "Z" built up from fragments of the numbers present in the sub-address fields sent by both callers. In contrast, caller identification makes it possible to associate only those sub-addresses that have all been received from the same origin.

By way of example, consider a called number "Z", made up of nine digits (L=9; and take Z=9 87 65 43 21) and assume that the maximum length of the sub-address is equal to four digits (Nsa=4). At the TDN, it is necessary to set up three successive telephone calls. The first two calls do not get through, whereas the third call does, optionally authorizing opening of the B channel for voice communication and starting charging (e.g. assuming that the number "Z" is not busy, see above).

In this example, the first telephone call from "X" to "Y" contains the following sub-address (0, 9, 9, 8). The first two digits give the length of the called number "Z", i.e. 09 in this case. The next two digits are the first two decimal digits of the number "Z".

The second telephone call from "X" to "Y" contains the following sub-address (7, 6, 5, 4).

The third telephone call from "X" to "Y" contains the following sub-address (3, 2, 1).

The mechanism described above is entirely suited to ISDN telephone installations capable of handling direct dialing-in (DDI: one number "X" per internal telephone extension). For telephone installations that do not handle DDI, different internal telephone sets are "seen" from the ISDN as having a common single number "X". This can give rise to ambiguities appearing if two internal extensions call the same intermediary simultaneously. All call setup requests will appear to come from the same number "X" and the first intermediary will not be able to distinguish between a call from a first extension AA and a call from a second extension BB, both at the same calling site. This can give rise to errors in reconstructing the number "Z" if L+2 is greater than Nsa. These ambiguities can be avoided by modifying the above-described sub-address encoding. For example, it suffices to inject as the first digit of the sub-address in each setup request from a given internal extension a digit selected at random from 0 to 9. Under such conditions, the number of setup requests that are needed before a useful telephone call can be set up increases, but it becomes possible for up to ten different extensions to call the first intermediary simultaneously.

In the preceding example, Nte=4 setup requests are needed instead of three (for a nine-digit number associated with a sub-address having a maximum of four digits).

The means for encoding the called number as successive messages for transmission via the sub-address can be selected freely from the range of encoding techniques available. The "direct" encoding method described above is not the only possible example.

If a PABX is selected as the interface 3 (FIG. 1), then the called number encoding and processing mechanism can be installed in the form of software in the control unit (CU) of the PABX. This mechanism is integrated in a functional block labelled TDN (or the coder referenced 5 in FIGS. 1 and 2).

A PABX essentially comprises two functional blocks:
  a control unit that handles dialing, billing, and advance telephone functions, possibly by means of the D protocol; and
  the switching network RCX that interconnects incoming and outgoing lines, and possibly lines of the same kind (e.g. two internal lines for communication within a given site or two outgoing lines for the function of interconnecting two external calls).

On being so requested by an extension, the CU stores the requested destination number "Z" and it calculates (step 102) the length "L" thereof (expressed as a number of digits), in the manner explained above.

If Nsa is the maximum sub-address length, and if (test 103) Nsa is less than (L+2), then the number "Z" is subdivided (step 106) into pieces: the first (Nsa−2) digits, then the following Nsa digits, etc., until all of the digits of "Z" have been used up.

The CU then requests a telephone call to the first intermediary with identification of the caller and injecting (steps 107 and 108) into the sub-address field:
  the length L of the number "Z" (as a number of digits); and then
  the first (Nsa−2) digits of the number "Z".

This request is acknowledged by a release signal (step 110) from the GAI.

The CU then requests a new call, identical to the first, but using (steps 111 and 108) the following Nsa digits in the number "Z" for the sub-address. This new request is acknowledged by being released.

This iterative process continues until (test 109) all of the digits of "Z" have been sent. The last iteration is not acknowledged by being released: the GAI waits (step 112) for a call to be established from "Y" to "Z", or it eventually times out, within the limits of the ISDN concerned.

The analog device at the first intermediary (the GAI) can then allow the call to be set up over the B channel, thus enabling voice communication with the destination called party (whose number is "Z") assuming that a voice call (ISDN, SDN, leased link (intermediate transmission), or by any other means) has been established between the first intermediary and the destination called party (two voice calls being connected together).

With this mechanism, a single call attempt is possible at a given instant from multi-extension installations that do not have DDI. In such special cases, the TDN can store any simultaneous request for a given first intermediary from another extension (on the same calling site). Once the present indirect call request has been satisfied (call connected) or rejected (failure to contact "Z") by the first intermediary, then the next waiting request can be processed by the TDN. Using the D channel of the digital network for all of these call setup stages makes it possible to guarantee very short cycle times. The other non-DDI method consists in inserting, in the code for the number "Z", a code such as a decimal digit representing the extension.

The technical means constituting this second variant embodiment can also be installed in ISDN telephone terminals.

These are usually constituted by the following three functional blocks (see FIG. 2):
  the S interface control module 18 (ISDN user interface) of network 2;
  the module 19 for telephone and acoustic functions: coding and decoding speech signals received and/or sent via a handset 20 or possibly a loudspeaker 21 (digital/analog conversion), generating certain acoustic signalling signals for analog networks; and
  the user-terminal dialog module 12: the usual keys on analog telephone sets are accompanied by function keys for activating additional ISDN services or for gaining access to the enhanced telephone functions of a PABX.

Figure 2:
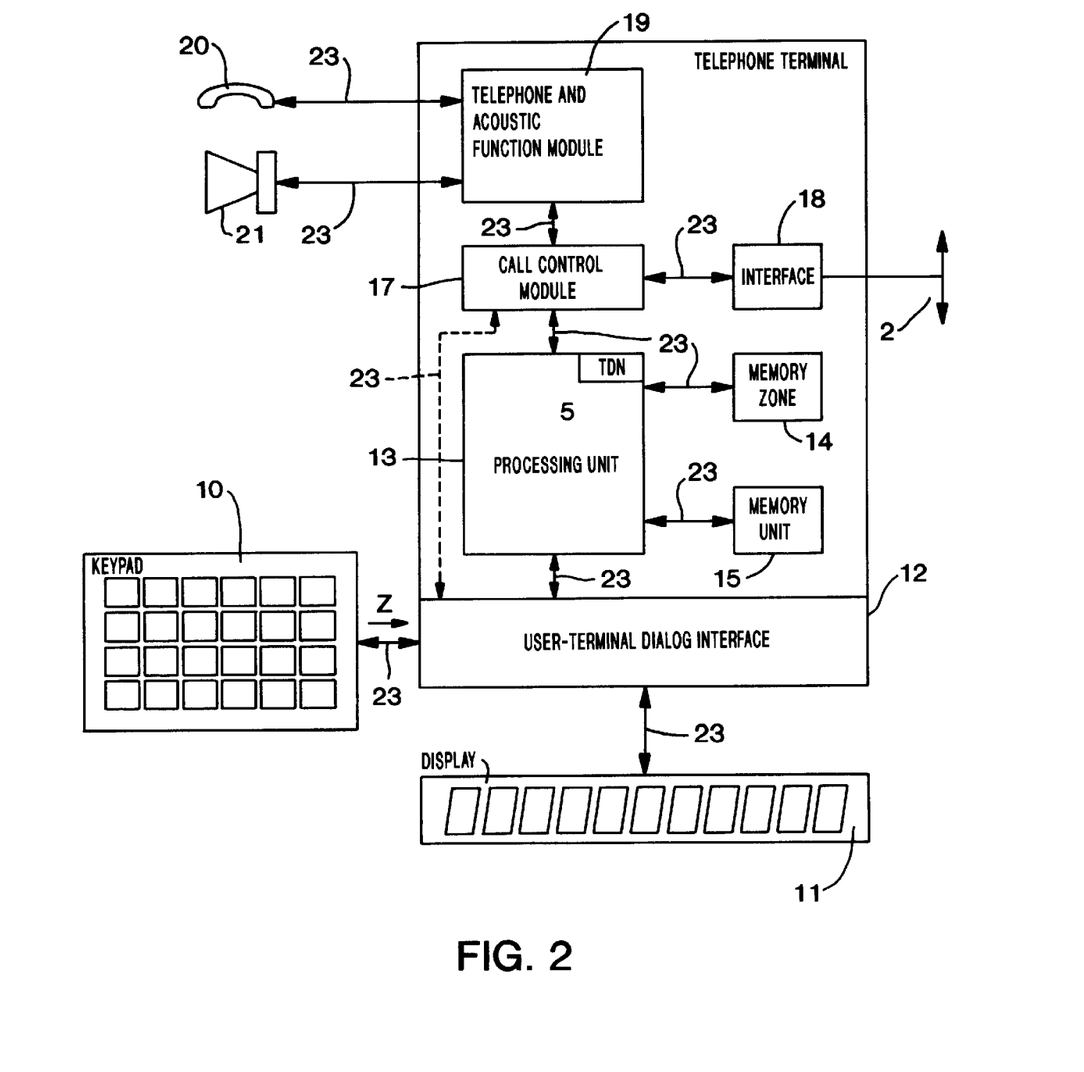
FIG. 2 is a diagram showing the components of a telephone terminal in the second application of the invention.

These three modules are accompanied by a module 17 for controlling communications and which provides overall control: these modules and the input/output peripherals (or unit, i.e. the keypad 10 and the display 11) together with the transducers 20 and 21 are all interconnected by links 23.

Under these conditions, the TDN can be installed in the form of a new processing module 13 situated between the user-terminal dialog interface 12 and the call control module 17. Its task then consists in performing the following in succession:
  replacing the called number "Z" as input via the keypad 10 and the user-terminal dialog interface 12 with the number "Y" for the first intermediary;
  calculating the length of the number "Z" and deducing therefrom the number of call attempts (Nte) that will be required in application of the above algorithm; and
  requesting the call control module 17 to establish calls to the first intermediary via the interface 18 and with caller identification, while filling the sub-address in the manner described above so as to convey the number "Z" in full (possibly in successive portions).

The GAI or decoder (reference 6 in FIG. 1) can be implemented in the form of software in a PABX. If the RNIS-PABX supports an automatic call interconnection function, then it can act as the member controlling access to the network 9 (STN, ISDN, leased line, etc.) outgoing from the retailer 4, and can therefore serve as an interface for output telephone networks that can access the requested destination called party at the number "Z".

On the first call setup request from the caller at number "X", the software in the GAI must read the sub-address. The first two digits are read first since they give the length of the number "Z" thus making it possible, given the maximum length Nsa of a sub-address, to determine the number Nte of successive call setup attempts that will come from "X" (see above).

The remainder of the sub-address is stored as the initial digits of "Z".

If Nsa (test 210) is less than (L+2), then the GAI needs to wait for subsequent call setup requests from "X" in order to complete the number "Z". The GAI does not proceed with call setup requests from "X" until it knows "Z" in full.

Once it does know "Z" in full (after the Nte-th call setup request), the GAI requests opening of the B channel to allow voice communication, provided certain conditions are satisfied. These conditions are as follows:

no busy signal from party "Z" (if reached over the STN); and party "Z" answers before some maximum duration (Tmax) at the end of which an ISDN call setup request must be terminated (released or connected).

This mechanism makes it possible for user "X" to avoid being charged for an ISDN call to the first intermediary unless it has been possible to make a connection with "Z" (a failed attempt is possible with the first embodiment and impossible in this case).

The communications protocol has four essential steps:

Step 1: preparing call setup requests on the TDN.

The TDN builds up the call setup request(s) (parameter Nte described above) destined for the first intermediary: it substitutes the number of the first intermediary for the requested number "Z" and it includes the number "Z" in one or more sub-address fields.

Step 2: from the TDN to the GAI (from "X" to "Y").

The TDN requests an ISDN call having the following characteristics:

a) caller identification (number "X");

b) the called party is the first intermediary (number "Y"); and c) a sub-address containing the number "Z" in part or in full.

If Nte successive call setup requests (Nte>1) are necessary because the length of a sub-address is insufficient for conveying the number "Z" in full, then the GAI does not continue with the (Nte−1) first call setup request (i.e. it releases them, after identifying them by means of the caller number "X" which it already knows from characteristic a) above).

When all Nte call setup requests from the same source have been received, the GAI has all the information it requires for setting up a call from the first party to the party having the number "Z".

Step 3: reconstructing the number "Z".

The GAI has the number "Z" in full which it has reconstructed as required by concatenating successively received sub-addresses whenever the maximum length of a sub-address on the ISDN used is insufficient for conveying the number "Z" in full during a single call setup request.

Step 4: setting up a call both to "Z" and to the originator "X".

The GAI requests a voice call between the intermediary and the party at number "Z".

If party "Z" is busy (over an STN), the GAI returns that information immediately to the originator "X" by means of the appropriate release message in the D protocol.

If party "Z" can be reached, then two situations can arise:

party "Z" answers before expiry of a time limit Tmax that is less than the maximum time within which the last call setup request from "X" to the intermediary must be terminated under the D protocol (i.e. the maximum time allowed for the call to be released or set up) over the ISDN used from "X" to "Y". Under these conditions, two voice calls, firstly from "X" to "Y" and secondly from "Y" to "Z" are interconnected so as to enable end-to-end connection from "X" to "Z". There is no need for a detailed description of the process whereby two voice calls are interconnected since numerous existing devices can perform that function (e.g. certain PABXes having recent versions of software).

A maximum time limit Tmax (as defined above) expires at the GAI without party "Z" answering. When that happens, the last call setup request from "X" to "Y" is terminated (rejected) using the D protocol, thereby making it possible to avoid the calling user being charged for a call.

The third embodiment uses the ISDN supplementary service for "user-to-user" signalling to convey the destination called number "Z" from the caller "X" to the first intermediary "Y".

This third variant embodiment is similar to the second embodiment described above and has the same advantages.

The supplementary service for "user-to-user" signalling consists in a field having a maximum of 128 characters (bytes) conveyed in the messages for setting up or releasing a D protocol call.

The TDN uses this supplementary service (known as MINIMESSAGE in France) to convey the number "Z" of the called party to the communications retailer.

This information which is required for setting up a call between the caller and the called party therefore passes over the D channel.

The economic advantage of this embodiment results from the fact that in many countries the cost of the supplementary service for "user-to-user" signalling is very low.

In national ISDN implementations, the maximum number of characters for user-to-user signalling is less than 128. For example, in France, user-to-user signalling is restricted to ten characters in its User-to-User Facility variant and is restricted to 35 to 67 bytes in its User-to-User information variant (see STAS Numeris, edition 3, Vol. 4, par. 7). This limit is therefore insufficient for transmitting any number in the worldwide public numbering plan. Under such circumstances, the invention adapts to the size constraints of user-to-user signalling in the following manner which is similar (if not identical) to that described above in the second embodiment.

Let Nmm be the maximum number of characters that can be conveyed by user-to-user signalling in a given ISDN system (Nmm>0).

As in the second embodiment, the TDN uses a plurality of successive call setup requests to convey the entire number of the called party to the retailer. The GAI sets up the call only after the entire number has been received.

For example, in a manner similar to the method described for the second variant embodiment, the first two characters of user-to-user signalling in the first call setup message can represent the length of the destination called number "Z" (e.g. expressed in decimal digits and thus lying in the range 1 to 99). This informs the GAI about the number of attempts that will be needed to set up the call.

If Nte is the number of call setup attempts and L is the number of decimal digits in the number "Z" of the destination called party, and if E(n) designates the integer portion of n, then Nte E([L+1]/Nmm)+1. The parameter L is sent first to the device at the first intermediary so as to enable it to calculate Nte. For all call setup requests coming from the same caller "X", with the exception of the last request (i.e. the Nte-th), the GAI causes a negative acknowledgment (release) to be returned to the setup request so as to disconnect channel D, thereby enabling the Nte successive setup requests to be run very quickly one after another (using channel D exclusively).

This solution shows that using the service for identifying an ISDN caller is essential for conveying "Z" via the first intermediary, since otherwise ambiguities could arise in the manner described above for the second variant.

By way of example, consider a called number "Z" comprising nine digits (L=9; and assume Z=9 87 65 43 21) and it is assumed that the maximum length of the user-to-user signalling is equal to four characters (Nmm=4). This makes it necessary for the TDN to initiate three successive telephone calls. The first two calls do not get through, but the third call terminates and possibly enables channel B to be opened for voice communication with the destination called party (e.g. assuming that the number "Z" is not busy).

In this example, the first telephone call from "X" to "Y" contains the following user-to-user signalling "0998". The first two characters give the length of the called number "Z", i.e. 09 in this case. The last two characters are the first two digits of the number "Z".

The second telephone call from "X" to "Y" contains user-to-user signalling "7654".

The third telephone call from "X" to "Y" contains user-to-user signalling "321".

As in the second variant, for telephone installations that do not have DDI, different internal extensions are seen from the ISDN as having the same unique number "X". This means that ambiguities could appear if two extensions both call the first intermediary simultaneously, thus giving rise to errors in reconstructing the number "Z" if L+2 is greater than Nmm. Under this condition, such ambiguities can be avoided by modifying the user-to-user signalling code in the same manner as described above. It then suffices to inject as a first character in the user-to-user signalling for all setup requests from a given internal extension a character that is selected at random in the range "a" to "z", for example. Under such conditions, the number of call setup requests that are required before the wanted telephone call can actually be established increases, but up to 26 different extensions can all call the first intermediary simultaneously. In the preceding example, it is necessary to use Nte=4 setup requests instead of three (for a nine-digit number "Z" and for user-to-user signalling having a maximum of four characters).

Since user-to-user signalling conveys bytes, it is possible to code the number "Z" in hexadecimal so as to convey two digits of "Z" per byte instead of only one digit per byte as in the method described above. Returning to the above example (Z=9 87 65 43 21), the user-to-user signalling contains the following string (in hexadecimal): 09 98 76 54 32 1x (where x is an arbitrary hexadecimal digit), i.e. only six bytes instead of eleven as before. It is even possible to make do with five bytes of user-to-user signalling if it is assumed that the length of a telephone number is always less than or equal to 10 digits. User-to-user signalling would then contain the following string (in hexadecimal): 99 87 65 43 21. This type of coding can make it possible to reduce the number of iterations (successive setup requests) possibly down to one which is the optimum value.

Figure 1:
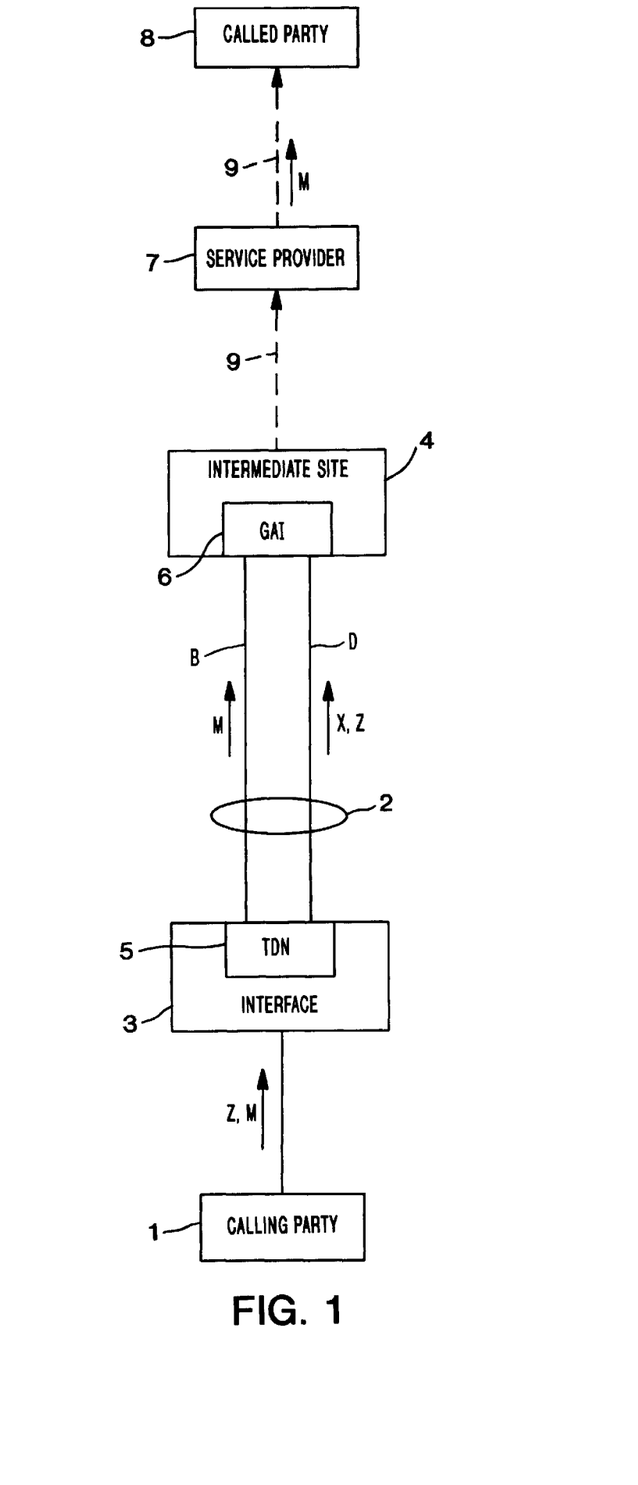
FIG. 1 is a block diagram showing the components of a telecommunications system in the second application of the invention.

If a private exchange (PABX) is selected as the interface 3, then the mechanism can be installed in the form of software in the control unit CU of the PABX.

On request from a dedicated station, the CU stores the destination requested number "Z" together with its length L (expressed as a number of digits) which it calculates.

If Nmm is the maximum length of user-to-user signalling and if Nmm is less than (L+2), then the number "Z" is subdivided into pieces: the first (Nmm−2) digits followed by the next Nmm digits, etc., until all of the digits in "Z" have been used up.

The CU then requests a telephone call with caller identification to the first intermediary by injecting the following in the user-to-user signalling:

the length L of the number "Z" (as a number of digits); and then the first (Nmm−2) digits of the number "Z".

The CU abandons the call after receiving over the D channel confirmation that the call has been set up.

The CU then requests a new call identical to the first, but using the following Nmm digits of "Z" in the user-to-user signalling.

The above iterative process is continued until all of the digits of "Z" have been used up.

The analog device at the first intermediary (referred to as the GAI) can then authorize the setting up of a call over the B channel, thus enabling voice communication with the destination party at number "Z", assuming that voice communication is effectively established between the first intermediary and the destination party.

With this mechanism, only one call attempt can be made at any given instant from multi-extension installations that do not have DDI. In such special cases, the TDN stores all concurrent requests from any other internal extension going to the same first intermediary. Once the current indirect call request has been satisfied (connected) or rejected (released) by the first intermediary, then the following, waiting call can be processed by the TDN.

The technical means constituting this third variant of the invention can also be installed in ISDN telephone terminals.

Under such conditions, the TDN can be installed in the form of a new module situated between the user-terminal dialog interface and the call control module. Its task then consists in the following in succession:

replacing the number "Z" requested over the user-terminal dialog interface with the number of the first intermediary;

calculating the length of said number "Z" and deducing therefrom the number Nte of call attempts that will be necessary, in application of the above algorithm; and requesting the call control module to establish a call to the first intermediary with caller identification and while filling the user-to-user signalling in the manner described above with the number "Z" in full (or possibly in successive portions).

The GAI can be installed in the form of a new version of software in a PABX.

On receiving the first call setup request from caller at number "X", the software implementing the GAI must read the user-to-user signalling. The first two characters are read initially since they give the length of the number "Z" which makes it possible, given the maximum length Nmm available for user-to-user signalling, to determine the number Nte of successive call setup attempts that will come from "X".

The remainder of the user-to-user signalling is stored as the first digits of Z.

If Nmm is less than L+2, then the GAI must wait for following call setup requests from "X" to complete the number "Z". The GAI therefore does not continue with (i.e. it releases) call setup requests from "X" until "Z" is known to it in full.

Once "Z" is known in full (after the Nte-th setup request), the GAI requests opening of the B channel to enable voice communication providing certain conditions are satisfied. These conditions are identical to those mentioned above concerning the second variant embodiment.

The communications protocol comprises four essential steps that are identical or similar to those of the protocol in the second variant (see above).

Step 1: preparing call setup requests over the TDN.

The TDN builds up the call setup request(s) to the first intermediary on the basis of the parameter Nte described above: it replaces the requested number "Z" with the number of the first intermediary and it includes the number "Z" in one or more user-to-user signalling strings.

Step 2: from the TDN to the GAI (from "X" to "Y").

The TDN requests an ISDN call having the following characteristics:

a) caller identification (number "X");

b) the called party is the first intermediary (number "Y"); and c) user-to-user signalling contains the number "Z" in part or in full.

If Nte successive call setup requests are required (Nte>1) because the length of user-to-user signalling is insufficient to convey the number "Z" in full, then the GAI does not proceed with the first (Nte−1) setup requests (it releases them, and it identifies them because of the caller number "X" which it knows from characteristic a) above).

When all Nte call setup requests coming from the same origin have been received, the GAI has all the information it needs to establish a call from the first intermediary "Y" to the party at number "Z".

Step 3: reconstructing the number "Z".

The GAI has the number "Z" in full, and it reconstructs it when necessary by concatenating the successively received user-to-user signalling if the maximum length of the user-to-user signalling over the ISDN used is not sufficient for conveying the number "Z" in full in a single call setup request.

Step 4: a call is set up both to "Z" and to the caller "X": this step is identical to step 4 of the above-described protocol for the second variant embodiment.

Both the second and the third above-described variants can be installed simultaneously in a given TDN or a given GAI.

The advantage of simultaneously installing both implementations in the same device lies in matching the technical and charging characteristics of the ISDN used. For example, if an ISDN gives free use of a sub-address having a maximum length of 20 digits, then the user can set the parameters of the combined device to an operating mode that corresponds to the second variant embodiment.

The processing unit 13 referred to above as the TDN, of the terminal or device equipping the intermediate site (then referred to as the GAI) is preferably connected to a memory unit (reference 15, FIG. 2) storing the number(s) (referenced above as Nsa or as Nmm) designating the maximum numbers of digits (or of characters) that can be contained in the supplementary service sub-addressing message (or in the user-to-user signalling message) as used in the second variant (or the third variant) for the purpose of conveying the called number "Z".

I claim:

1. A method of establishing a telecommunications call between a calling party having a calling party terminal, and a destination called party, said destination called party having a destination call number Z, said calling party terminal and said destination called party being connected to an automatic telecommunications network that includes an Integrated Services Digital Network (ISDN) having a D-Channel which includes a user-accessible supplementary service, wherein said calling party terminal is connected to said ISDN to route said telecommunication call through an intermediate exchange which is connected to said ISDN, said intermediate exchange having an intermediate call number Y and a phone switch device, comprising the steps of:

dialing said destination call number Z on said calling party terminal;

substituting said intermediate call number Y in said calling party terminal in place of said destination call number Z;

establishing a first call request from said calling party terminal to said intermediate exchange;

transmitting said destination call numnber Z from said calling party terminal to said intermediate exchange by using said user-accessible supplementary service;

establishing a second call request from said intermediate exchange to said destination called party;

determining whether said destination called party is available; and if said called party is available, establishing said telecommunication call via said intermediate exchange by interconnecting said first call request with said second call request.

2. The method according to claim 1 further including the step of calculating a length of the destination call number Z prior to transmission thereof, and then transmitting said length to the intermediate exchange via said D-channel.

3. The method according to claim 1 further including the steps of using data processing means to calculate a length of said destination call number Z and to code said destination call numnber, and then transmitting information representative of said length by said calling party terminal to said interniediate exchange through said user-accessible supplementary service prior to transmitting said destination call number Z under a coded form.

4. The method according to claim 1 further including the step of transmitting a selection code A by said calling party terminal to a first node of said automatic telecommunications network by using said user-accessible supplementary service, said selection code corresponding to said intermediate call number.

5. The method according to claim 1, wherein said user-accessible supplementary service is a sub-addressing service.

6. The method according to claim 1, wherein said user-accessible supplementary service is a user-to-user signaling service.

* * * * *